US008427685B2

(12) United States Patent
Van Hoof et al.

(10) Patent No.: US 8,427,685 B2
(45) Date of Patent: Apr. 23, 2013

(54) FAX ACCOUNTS

(75) Inventors: Hubert Van Hoof, Seattle, WA (US);
Manoj K. Jain, Hyderabad (IN);
Raghavendra Rachamadugu,
Hyderabad (IN); **Grandhi V. A.
Srinivasulu**, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/825,719

(22) Filed: Jun. 29, 2010

(65) Prior Publication Data

US 2010/0290087 A1    Nov. 18, 2010

Related U.S. Application Data

(63) Continuation of application No. 11/619,839, filed on Jan. 4, 2007, now Pat. No. 7,768,668, which is a continuation of application No. 11/460,169, filed on Jul. 26, 2006, now abandoned.

(51) Int. Cl.
*G06F 3/12* (2006.01)
*G06F 15/16* (2006.01)
*H04N 1/32* (2006.01)

(52) U.S. Cl.
USPC .......... 358/1.15; 358/442; 709/206; 709/250

(58) Field of Classification Search ................. 358/1.15, 358/402, 442, 444, 468, 403, 404, 405, 407, 358/1.13; 379/1.13, 100.01; 709/203, 206, 709/245, 250
See application file for complete search history.

(56) References Cited

U.S. PATENT DOCUMENTS

| | | | |
|---|---|---|---|
| 5,054,096 A | | 10/1991 | Beizer |
| 5,602,572 A | | 2/1997 | Rylander |
| 5,954,510 A | * | 9/1999 | Merrill et al. ................. 434/236 |
| 5,991,733 A | * | 11/1999 | Aleia et al. .................... 705/7.13 |
| 6,081,344 A | | 6/2000 | Bockman et al. |
| 6,088,126 A | | 7/2000 | Khouri et al. |
| 6,134,017 A | * | 10/2000 | Schlank et al. .............. 358/1.15 |
| 6,170,930 B1 | | 1/2001 | Wallace |
| 6,311,211 B1 | * | 10/2001 | Shaw et al. ................... 709/206 |
| 6,859,289 B1 | | 2/2005 | Walmsley |
| 7,079,275 B2 | | 7/2006 | Henry et al. |
| 7,274,476 B2 | | 9/2007 | Eguchi et al. |
| 7,512,117 B2 | * | 3/2009 | Swartz .......................... 370/352 |

(Continued)

OTHER PUBLICATIONS

"Final Office Action", U.S. Appl. No. 11/460,169, filed Apr. 7, 2009, 9 pages.

(Continued)

*Primary Examiner* — Madelein A Nguyen
(74) *Attorney, Agent, or Firm* — Wolfe-SBMC

(57) ABSTRACT

A fax account is described and creates an association between users and documents that are faxed. A fax account allows a user to secure their faxed documents and organize and streamline fax communication via different transports. In at least some embodiments, security is enhanced through the use of an authentication model that authenticates individual users before giving them access to the fax functionality or, more accurately, their fax account. In at least some embodiments, fax accounts also provide users with an infrastructure through which they can manage their documents. In addition, in at least some embodiments, fax accounts can be used to manage and direct received faxes to the intended recipient, thus reducing the possibility of an unintended recipient gaining access to the fax.

19 Claims, 12 Drawing Sheets

U.S. PATENT DOCUMENTS

| | | | |
|---|---|---|---|
| 7,613,929 B2 | 11/2009 | Cohen et al. | |
| 7,624,439 B2 | 11/2009 | Koestler | |
| 7,768,668 B2 | 8/2010 | Van Hoof | |
| 7,990,950 B2* | 8/2011 | Zucker | 370/352 |
| 2001/0000441 A1 | 4/2001 | Zinkov et al. | |
| 2001/0022669 A1 | 9/2001 | Baba | |
| 2002/0075521 A1 | 6/2002 | Oobayashi | |
| 2002/0112007 A1 | 8/2002 | Wood et al. | |
| 2002/0129108 A1* | 9/2002 | Sykes, Jr. | 709/206 |
| 2002/0130904 A1 | 9/2002 | Becker et al. | |
| 2002/0191227 A1 | 12/2002 | Henry | |
| 2003/0048484 A1* | 3/2003 | Seki et al. | 358/402 |
| 2003/0058478 A1 | 3/2003 | Aoki | |
| 2003/0117665 A1 | 6/2003 | Eguchi et al. | |
| 2003/0120736 A1* | 6/2003 | Eguchi | 709/206 |
| 2003/0123098 A1 | 7/2003 | Bae | |
| 2004/0010328 A1 | 1/2004 | Carson et al. | |
| 2004/0039694 A1 | 2/2004 | Dunn | |
| 2004/0218226 A1* | 11/2004 | Antognini et al. | 358/402 |
| 2005/0063005 A1 | 3/2005 | Phillips et al. | |
| 2005/0088704 A1 | 4/2005 | Vashillo et al. | |
| 2005/0102349 A1 | 5/2005 | Rice et al. | |
| 2005/0114548 A1* | 5/2005 | Tucciarone et al. | 709/245 |
| 2005/0275901 A1 | 12/2005 | Ferguson et al. | |
| 2006/0098233 A1 | 5/2006 | Jodra et al. | |
| 2006/0109501 A1 | 5/2006 | Evans | |
| 2006/0143268 A1 | 6/2006 | Chatani | |
| 2006/0168648 A1 | 7/2006 | Vank et al. | |
| 2006/0236370 A1 | 10/2006 | John et al. | |
| 2006/0238820 A1 | 10/2006 | Hoof et al. | |
| 2006/0239245 A1 | 10/2006 | Van Hoof | |
| 2006/0294208 A1 | 12/2006 | Adams et al. | |
| 2007/0005718 A1 | 1/2007 | Fuisz | |
| 2007/0036141 A1* | 2/2007 | Zucker | 370/352 |
| 2007/0180448 A1 | 8/2007 | Low et al. | |
| 2007/0223031 A1 | 9/2007 | Kitada et al. | |
| 2007/0283143 A1 | 12/2007 | Yami et al. | |
| 2007/0285726 A1 | 12/2007 | Falk et al. | |
| 2008/0030794 A1 | 2/2008 | Van Hoof | |
| 2009/0234798 A1* | 9/2009 | Shibata | 707/1 |
| 2009/0254511 A1* | 10/2009 | Yeap et al. | 707/1 |
| 2012/0140915 A1* | 6/2012 | Gomez-Ortigoza | 379/229 |

OTHER PUBLICATIONS

"Non-Final Office Action", U.S. Appl. No. 11/619,839, filed Feb. 5, 2010, 8 pages.

"Notice of Allowance", U.S. Appl. No. 11/619,839, filed Apr. 28, 2010, 6 pages.

"Configuring Fax Routing", http://web.archive.org/web/20081202073631/http://support.gfi.com/manuals/en/fax12/fax12manual-1-031.html, (Aug. 23, 2004), 3 pages.

"Fax: A Strategic Messaging Platform", http://web.archive.org/web/20030503154633/http://www.gsfax.com/html/white_paper.htm, (May 3, 2003), 34 pages.

"Final Office Action", U.S. Appl. No. 11/112,975, filed Jun. 25, 2010, 20 pages.

"Final Office Action", U.S. Appl. No. 11/112,975, filed Jul. 17, 2009, 12 pages.

"Net SatisFAXtion", www.calecs.net/NetsatisFAXion.pdf, (2001), 2 pages.

"Non-Final Office Action", U.S. Appl. No. 11/112,975, filed Jan. 4, 2010, 12 pages.

"Non-Final Office Action", U.S. Appl. No. 11/112,975, filed Mar. 10, 2009, 10 pages.

"Venali Internet Fax Service", http://web.archive.org/web/20090420000049/http://www.venali.com/web_docs/microsoft/venIFS_desktop_Office2003.pdf http://www.pcworld.com/printable/article/id,112030/printable.html (Aug. 28, 2003), (Jun. 14, 2004), 24 pages.

"Non-Final Office Action", U.S. Appl. No. 11/460,169, filed Dec. 2, 2008, 4 pages.

* cited by examiner

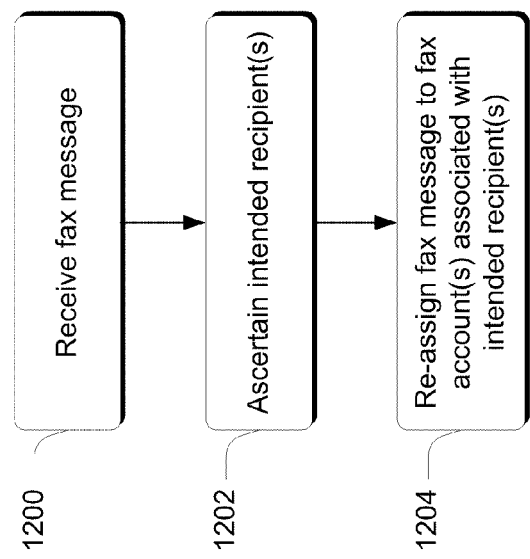

FAX ACCOUNTS

RELATED APPLICATION

This application is a continuation of and claims priority to co-pending application Ser. No. 11/619,839, filed on Jan. 4, 2007, entitled "Fax Accounts", which claims priority to application Ser. No. 11/460,169, filed Jul. 26, 2006, entitled "Fax Accounts," both of which are incorporated herein by reference.

BACKGROUND

In the past, there have been systems that allow a user to send and receive faxes from a computer, such as their desk top computer. Most if not all of these systems, however, suffer from drawbacks not the least of which pertains to security and privacy.

For example, in many systems there is no way to differentiate between users who might receive a fax. This is inherently caused by the lack of an unambiguous recipient identification in the standard fax protocols. Thus, if a particular computer is shared by more than one user, each user typically has access to all of the faxes that are received by that computer. In the event that a faxed document contains sensitive material, those other than the intended recipient may be able to view the document. This situation is further compounded when a fax server is utilized, such as one that might be utilized by a large enterprise. In the fax server scenario, anyone with access to the server can access and view faxed documents that may be intended for other recipients. Needless to say, this is not a desirable situation.

Accordingly, this invention arose out of concerns associated with providing improved methods and systems for faxing documents.

SUMMARY

In the embodiments described below, the concept of a fax account is introduced. Fax accounts create an association between users and documents that are faxed. A fax account allows a user to secure their faxed documents and organize and streamline fax communication via different transports. In at least some embodiments, security is enhanced through the use of an authentication model that authenticates individual users before giving them access to the fax functionality or, more accurately, their fax account. In at least some embodiments, fax accounts also provide users with an infrastructure through which they can manage their documents. In addition, in at least some embodiments, fax accounts can be used to manage and direct received faxes to the intended recipient, thus reducing the possibility of an unintended recipient gaining access to the fax.

BRIEF DESCRIPTION OF THE DRAWINGS

FIG. 12 illustrates steps in a method in accordance with one embodiment.

DETAILED DESCRIPTION

Overview

Figure 1:
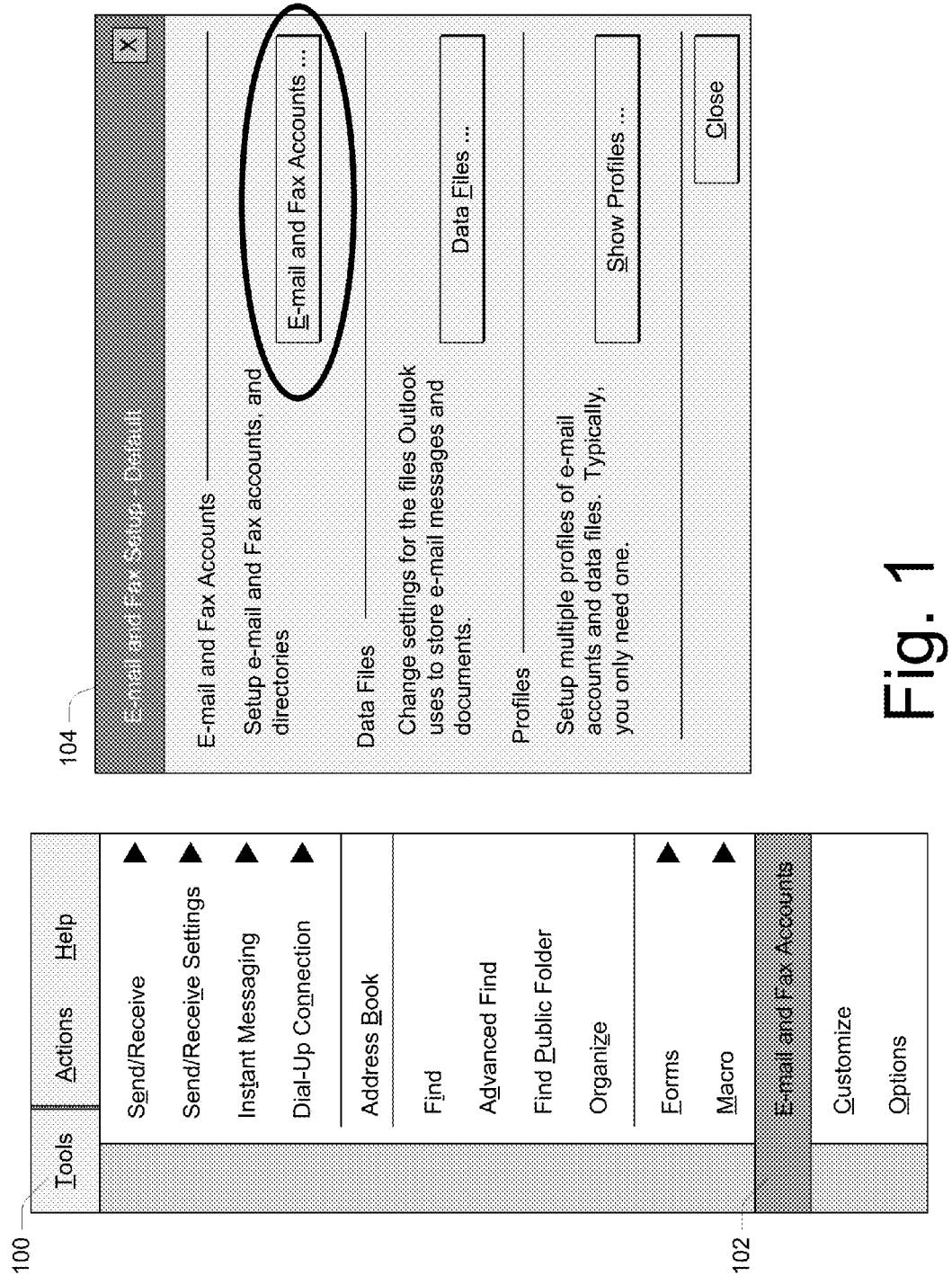
FIG. 1 illustrates a user interface in accordance with one embodiment.

In the embodiments described below, the concept of a fax account is introduced. Fax accounts create an association between users and documents that are faxed. A fax account allows a user to secure their faxed documents and organize and streamline fax communication via different transports, such as via a phone line/modem, a server (such as a Windows® server or Microsoft Exchange® server), an Internet fax service provider, and the like. Security is enhanced, in at least some embodiments, through the use of an authentication model that authenticates individual users before giving them access to the fax functionality or, more accurately, their fax account. Fax accounts also provide users with an infrastructure through which they can manage their documents. In the embodiments described below, the infrastructure that is employed is a folder infrastructure, although any suitable infrastructure can be utilized.

In addition, in at least some embodiments, fax accounts can be used to manage and direct received faxes to the intended recipient, thus reducing the possibility of an unintended recipient gaining access to the fax.

Further, fax accounts provide a foundation for extensibility into the future. Specifically, fax accounts can be embodied with properties and characteristics that further enhance the user experience. Accordingly, as developers come up with new and innovative features, these features can be easily incorporated into the overall fax functionality by virtue of the fax account.

Exemplary Embodiment

In the discussion below, the following terminology will be used. A client fax account (CFA) refers to an account created on a client machine that describes the particular fax connection and that details the settings used with that connection. In the illustrated and described embodiment, each fax connection can have just one CFA per user. A fax connection refers to a mechanism for delivering or receiving a fax—e.g., a fax modem, a dedicated fax server, etc. A server fax account (SFA) refers to an account created on a dedicated fax server that allows an individual user to make use of that server and that details the permissions and limitations of that use. In the illustrated and described embodiment, each user can have just one SFA for any particular server.

The discussion below starts with a description of how a user or system administrator might configure and set up fax accounts. As there are a number of different transports that might be employed to facilitate the fax functionality, the discussion below provides examples for several of these transports. Following this, a description of how one might use a fax account to create, send, receive and view faxes via the inventive system is provided.

Configuring a Fax Account

Assume that a first time user desires to set up a fax account so that he or she can send and receive faxes from their client machine. In the illustrated and described embodiment, setting up a fax account involves two distinct aspects.

First, the fax service that is to be utilized with the account needs to be configured. Configuring the fax service includes such things as selecting and configuring the transport layer that is to be used with the account. In the illustrated and described embodiment, there can be a number of potential transport layers. For example, the transport layer can be the computing device's local fax modem, a fax modem built into a connected multi-function peripheral (MFP) device, a server such as a Windows® fax server or a Microsoft Exchange® Server or a Fax Service Provider (FSP). In addition, configuring the fax service also includes setting up and configuring what is referred to as the backend infrastructure. The backend infrastructure includes such things as folder structures such as an Inbox, Drafts, Sent Items, and Outbox folders that help a user manage their fax messages, as well as storage.

Second, in addition to configuring the fax service, account-specific information is collected. Account-specific information includes such things as generic information about the user of the account (such as his or her name, organization, email address and the like). In addition, account specific information can include a direct inward dial (DID) number which can be used so that incoming faxes can be automatically assigned to the intended fax account. The account-specific information can be used for a number of things as well, such as automatically generating cover pages, populating the cover pages with a user's information, and as noted above, automatically assigning incoming faxes to the intended fax account.

Server Account Permissions, Creation and Configuration

In the illustrated and described embodiment, a fax account can be created in a couple of different ways. First, a system administrator can create a user-specific account on a fax server, such as a shared fax server. Second, an individual user can create a fax account on his or her local computing device.

In a shared fax environment, the server can maintain an Access Control List (ACL) for all the users that are permitted to use the fax functionality. The Access Control List can define not only who can access the fax functionality, but also which permissions are associated with which users. Permissions can include such things as permission to send and receive faxes, permission to move ahead in a fax queue, permission to fax documents during high use times, permission to change or modify account-specific data, and the like. In addition, fax or system administrators can define attributes for the individual accounts, such as those that control the amount of disk space allocated for any one account.

In the illustrated and described embodiment, folders are an integral part of a fax account and can be created based on the permissions. Folders can be employed in both the local scenario and the shared fax server scenario. For example, if the user has permission to receive faxes, then an Inbox folder can be created when the actual account is created. If the user has permission to send faxes, then the Outbox and Sent Items folder can be created.

In the fax server context, information associated with the fax account (such as company name, title, user and the like) is maintained on the server that holds the account. In some cases, the client and server will run on the same local machine which, in turn, means that the fax account information is maintained on the local machine.

Client Account Configuration

In at least one embodiment, fax accounts can be set up in the same way as e-mail accounts are set up. In this manner, the user is provided with an experience with which they may already be familiar. As such, the fax account setup can be invoked in a number of ways.

For example, as shown in FIG. 1, the user can select, from "Tools" menu 100, the "E-mail and Fax Accounts" menu item 102. Alternately or additionally, the user can select the E-mail and Fax Control Panel 104 and proceed from there. Alternately or additionally, the user may select one of a number of fax discovery options that may be available to them before a fax account exists.

Figure 2:
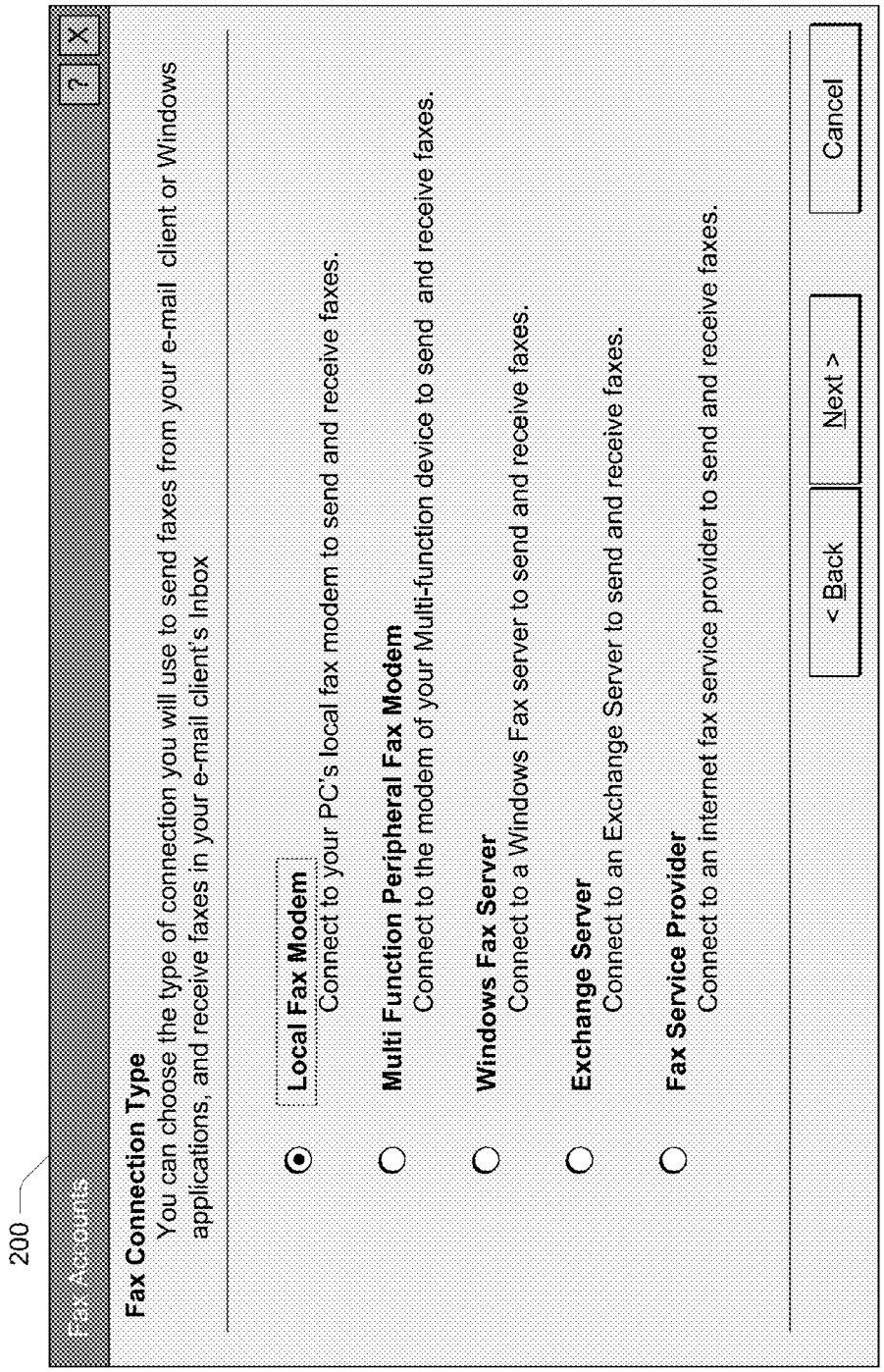
FIG. 2 illustrates a user interface in accordance with one embodiment.

As noted above, there are a number of potential transport layers or connection types that might be employed to implement the fax functionality. In accordance with one embodiment, during the account configuration phase, the user is presented with a user interface that allows them to select the connection type that they intend to use for receiving and sending faxes. As but one example of a user interface that presents different connection types for the user to select, consider FIG. 2.

There, user interface 200 presents multiple different connect types from which the user can select. In this particular example, five different connection types are displayed: a local fax modem, a multi-function peripheral (MFP) fax modem, a Windows® fax server, an Exchange® server, and a fax service provider. It is to be appreciated and understood that these particular connection types are not intended to limit application of the claimed subject matter to only these connection types. Rather, other connection types can be utilized without departing from the spirit and scope of the claimed subject matter.

As will be appreciated by the skilled artisan, in the Microsoft environment, the first three types of account require an association with an NT® Account. For example, bertv would be associated with ntdev\bertv (which is an NT Account 'bertv' on the 'ntdev' domain). By virtue of being associated with an NT® account, the NT® authentication model can be leveraged for use with the fax account. It is to be appreciated and understood that other authentication models can be utilized without departing from the spirit and scope of the claimed subject matter.

For the first two account options, the fax service that handles all incoming and outgoing fax traffic executes on the local machine. In this case, all faxes are physically stored on the local machine.

For the last three account options, the fax service executes on a remote server and accordingly, primary storage is remote. A local storage option can be provided for viewing and managing faxes off-line. For the Fax Service Provider scenario, fax storage can automatically follow the same rules as the e-mail account that is linked with it.

Fax Folders

Figure 3:
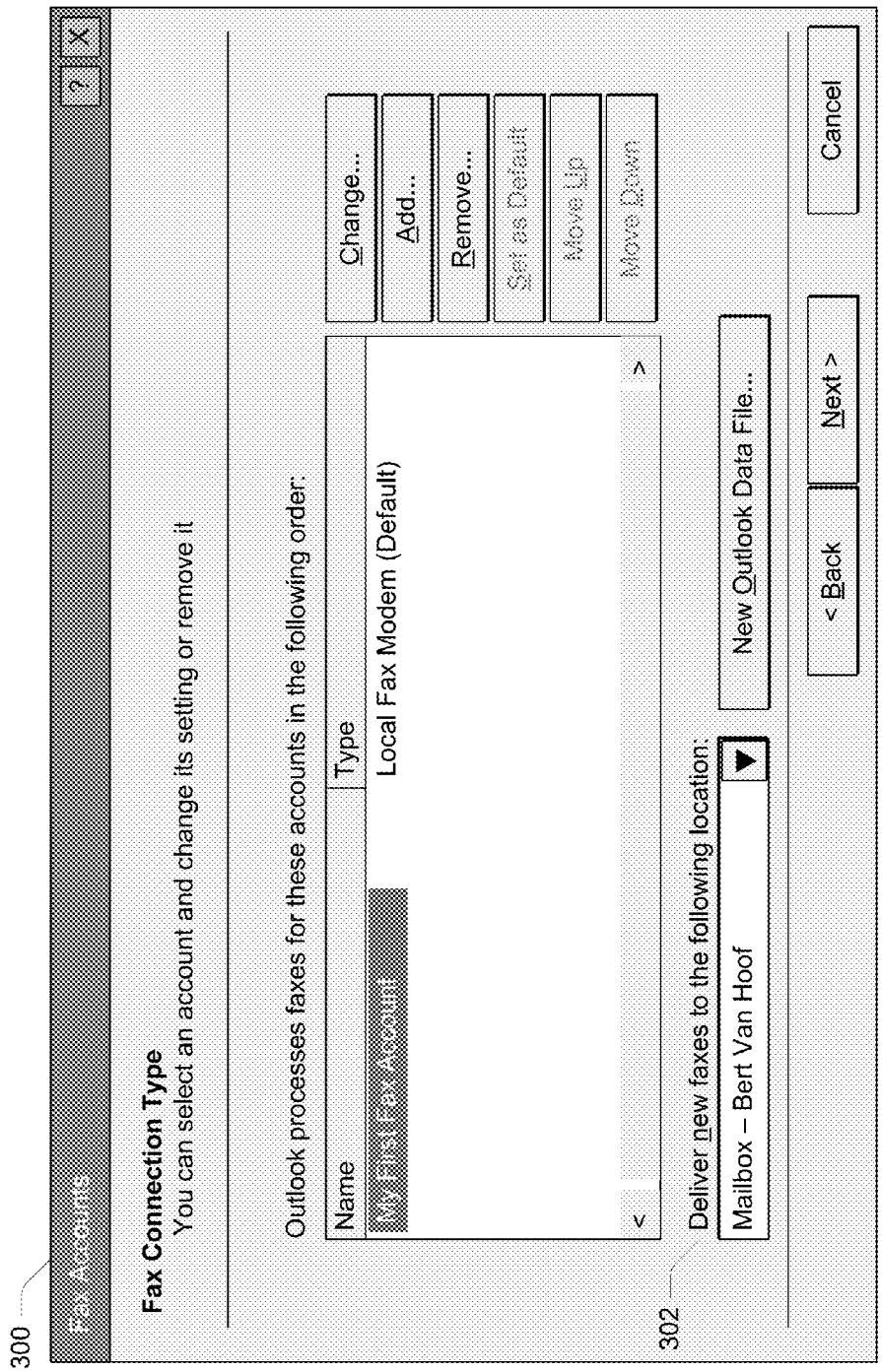
FIG. 3 illustrates a user interface in accordance with one embodiment.

As noted above, one of the features of a fax account is an infrastructure support system that enables a user to organize and manage faxes. As an example of a user interface that enables the user to establish and configure such an infrastructure, consider FIG. 3. There, a user interface 300 is presented to a user and enables the user to select an account and change its settings (such as by adding or designating folders), add a new account, or remove an account.

In the illustrated and described embodiment, in addition to default folders that can be provided, users can create and delete custom user-defined folders within their own account(s). In a shared fax server environment, a fax administrator can create and delete folders for any account on a particular server. Examples of default folders include, by way of example and not limitation, an Inbox folder, and Outbox folder, a Sent Items folder, a Deleted Items folder and a Drafts folder.

In addition, folders can be associated with access control lists or ACLs, which are used by a fax administrator to control user folder access. This adds a degree of security to the overall fax system. In addition, ACLs or permissions can be associated with the fax account in general. For example, ACLs or permissions can be used in scenarios where, for example, an administrator may wish to view faxes belonging to a particular user account. This is possible if the administrator has permissions on that particular user account.

In practice, a fax account can be represented in its own separate fax only folder structure with a separate root that reflects the account name. Alternately, the fax account can use a main mailbox in which e-mail messages are delivered. The latter scenario gives the user to flexibility to receive all inbound messages (whether email or faxed documents) in the same location. The "Deliver new faxes to the following location:" menu item 302 in user interface 300 allows the user to configure this aspect.

Account Types

As noted above, there can be different account types due to the different types of transports that are used to implement the fax functionality. Setting up each of the different types of accounts can have its own unique requirements. In the examples that follow, a description of how these different account types can be set up is provided. It is to be appreciated that the description below is not intended to limit application of the claimed subject matter. Rather, the explanation is provided to give the reader some context of how these different types of accounts can be set up and configured.

Figure 4:
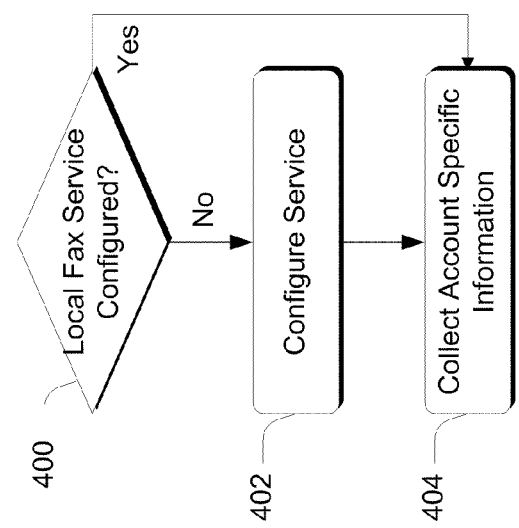
FIG. 4 illustrates steps in a method in accordance with one embodiment.

Consider first the local fax modem and MFP fax modem cases in connection with FIG. 4. There, an automated configuration method first ascertains, at step 400, whether the local fax service is configured. If the local fax service is not configured, then step 402 configures the local fax service. In the local fax modem case, this is done by, for example, configuring the fax modem hardware, as well as the fax service backend, as by creating the folder infrastructure for the user. In the MFP fax modem case, this can be done by selecting the MFP device and configuring the modem settings. If, on the other hand, the local fax service is configured, step 404 collects account specific information from the user. This step can be implemented through a suitably configured user interface. In at least some embodiments, the account specific information includes the account name and contact information, such as user name, office, title, phone number, fax number, address, and billing code.

Figure 5:
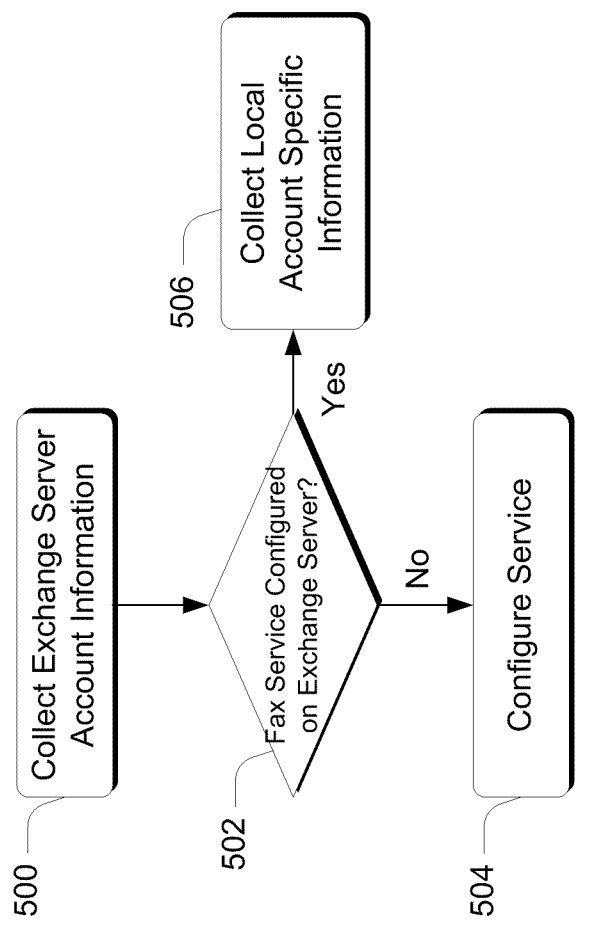
FIG. 5 illustrates steps in a method in accordance with one embodiment.

Consider now the Exchange® server case in connection with FIG. 5. There, an automated configuration method collects, at step 500, Exchange® server account information. In this particular example, this information includes the server name and account logon information such as the user's name and password. Step 502 ascertains whether the fax service is configured on the Exchange® server. If it is not, then step 504 configures the fax service. In this particular example, this step can be performed by prompting the user to contact their system administrator with a request to create a fax account. The system administrator can then take the steps that are necessary to set up and configure the account. In this example, the system administrator would create an Exchange® account for the fax user and populate the account the pertinent information, such as the account name, password, contact information (e.g. name, office title and the like), as well as a billing code if appropriate. In addition, the system administrator would configure the fax service backend. If, on the other hand, step 502 ascertains that the fax service is configured on the Exchange® server, step 506 can collect local account specific information from the user.

Figure 6:
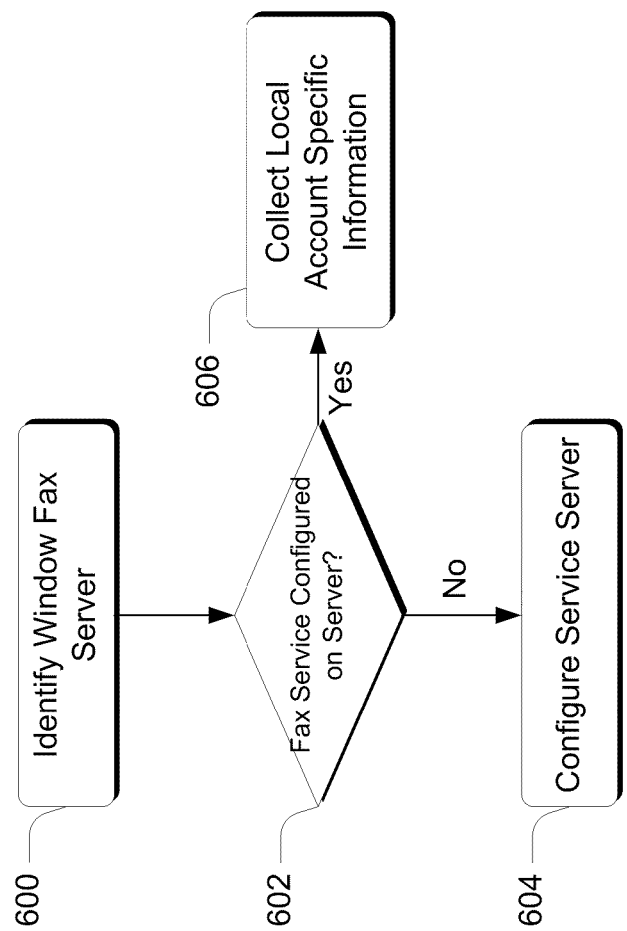
FIG. 6 illustrates steps in a method in accordance with one embodiment.

Consider now the Windows® fax server case in connection with FIG. 6. There, an automated configuration method identifies, at step 600, a Windows® fax server with which to connect. Step 602 ascertains whether the fax service is configured on the server. If not, then step 604 configures the fax service on the server. If, on the other hand, the fax service is configured on the server, then step 606 collects local account specific information.

Figure 7:
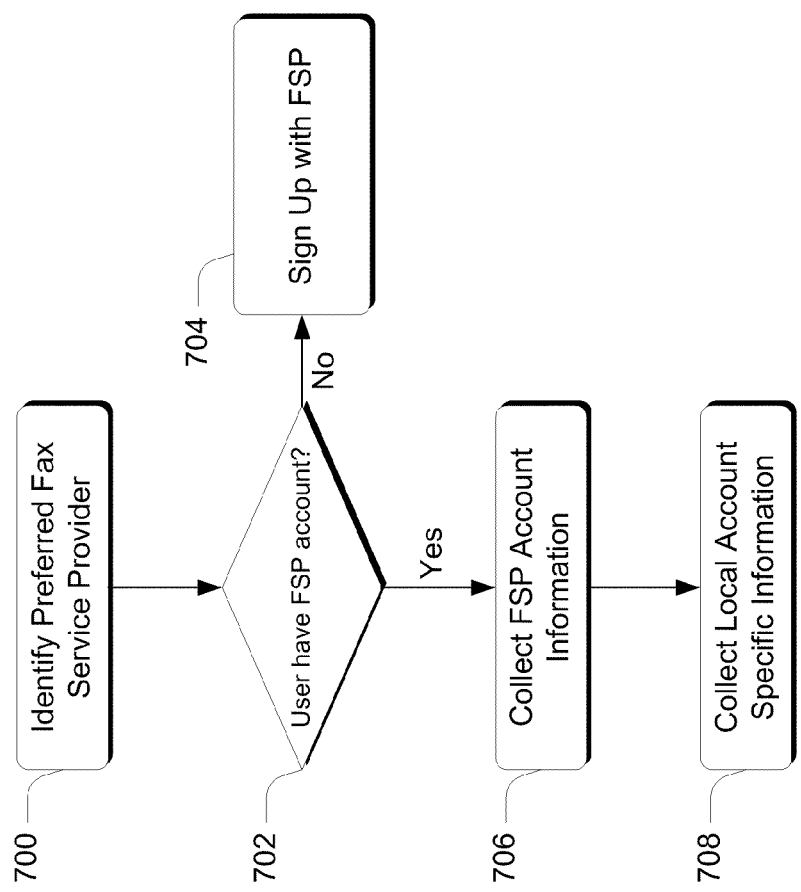
FIG. 7 illustrates steps in a method in accordance with one embodiment.

Consider now the fax service provider case in connection with FIG. 7. There, an automated configuration method first identifies, at step 700, a preferred fax service provider (FSP). This step can be accomplished by enabling the user to select from among a number of providers that may be presented to the user in a list. Step 702 ascertains whether the user has an account with the fax service provider. If not, then step 704 signs the user up with the FSP. This step typically involves accomplishing provider-specific tasks, such as collecting user and account information and submitting it to the FSP in the manner prescribed by the provider. This step also configures the fax service backend—which can include setting up an email account into which faxes are delivered.

If, on the other hand, step 702 ascertains that the user already has an FSP account, step 706 collects FSP account information, such as the user's name and password. Step 708 then collects local account specific information as described above.

Having now considered the notion of a fax account and how the fax account can be set up and configured, consider now how fax accounts look when deployed in two different scenarios—the local fax modem scenario and the shared fax server scenario.

Local Fax Modem Scenario

Figure 8:
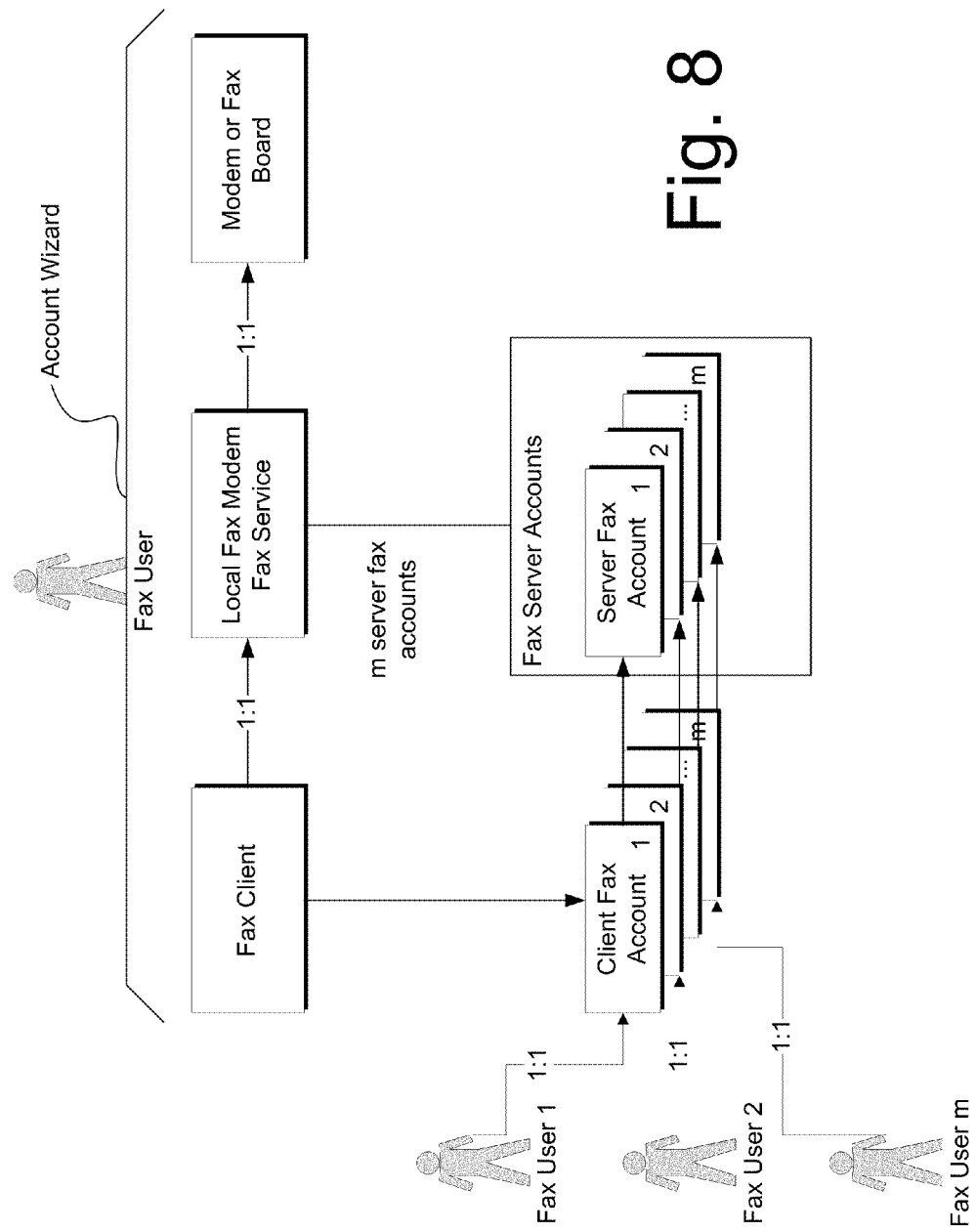
FIG. 8 illustrates an exemplary topology of a local fax modem service in accordance with one embodiment.

FIG. 8 shows an example of the local fax modem scenario in which a number of users (users 1 through m) have associated fax accounts.

In this example, the same client-server architecture that is utilized in the scalable shared fax server solution described below is utilized. In this example, the person setting up and maintaining the server settings is distinctly different than in a true client/server setup. This, in turn, invokes a distinct set of usability requirements.

In this scenario, a fax client (which is the software that interfaces with the users) and local fax modem service run on a single computing device. In this scenario, it can be advantageous to abstract away the technical implementation details from the user when setting up and configuring this solution. To do so, an account wizard can be utilized to guide the user through the set up procedure. In practice, the account wizard can execute the method of FIG. 5 described above. So in this case, for example, the account wizard interfaces with the users to assist them in setting up their fax account, configures the client fax accounts, the corresponding server fax accounts and, if necessary, the physical modem or fax board in the computing device.

In this example, there is a direct 1-to-1 mapping between all of these components. That is, each user has one client fax account and each client fax account has an associated server fax account. Each fax client is associated with one local fax service, and each fax service is associated with one modem or fax board. It is to be appreciated and understood that departures from this mapping scheme can take place without departing from the spirit and scope of the claimed subject matter. In the event that there are multiple modems in the client device, one of the modems is selected and used for fax purposes.

Hence, when a user logs in to the system, they log in through the fax client. In some embodiments, the fax account ties into security and authentication functionality which provides a degree of security for the user. But one example of security and authentication functionality is the Windows NT® authentication model, as mentioned above.

Shared Fax Server Scenario

In the shared fax server scenario, the architecture is the same as or similar to that of the local fax scenario. In this case, however, there is a more traditional client/server relationship in which the fax client executes on a client device, and the shared fax functionality executes on one or more servers that are typically remote from the client device.

Figure 9:
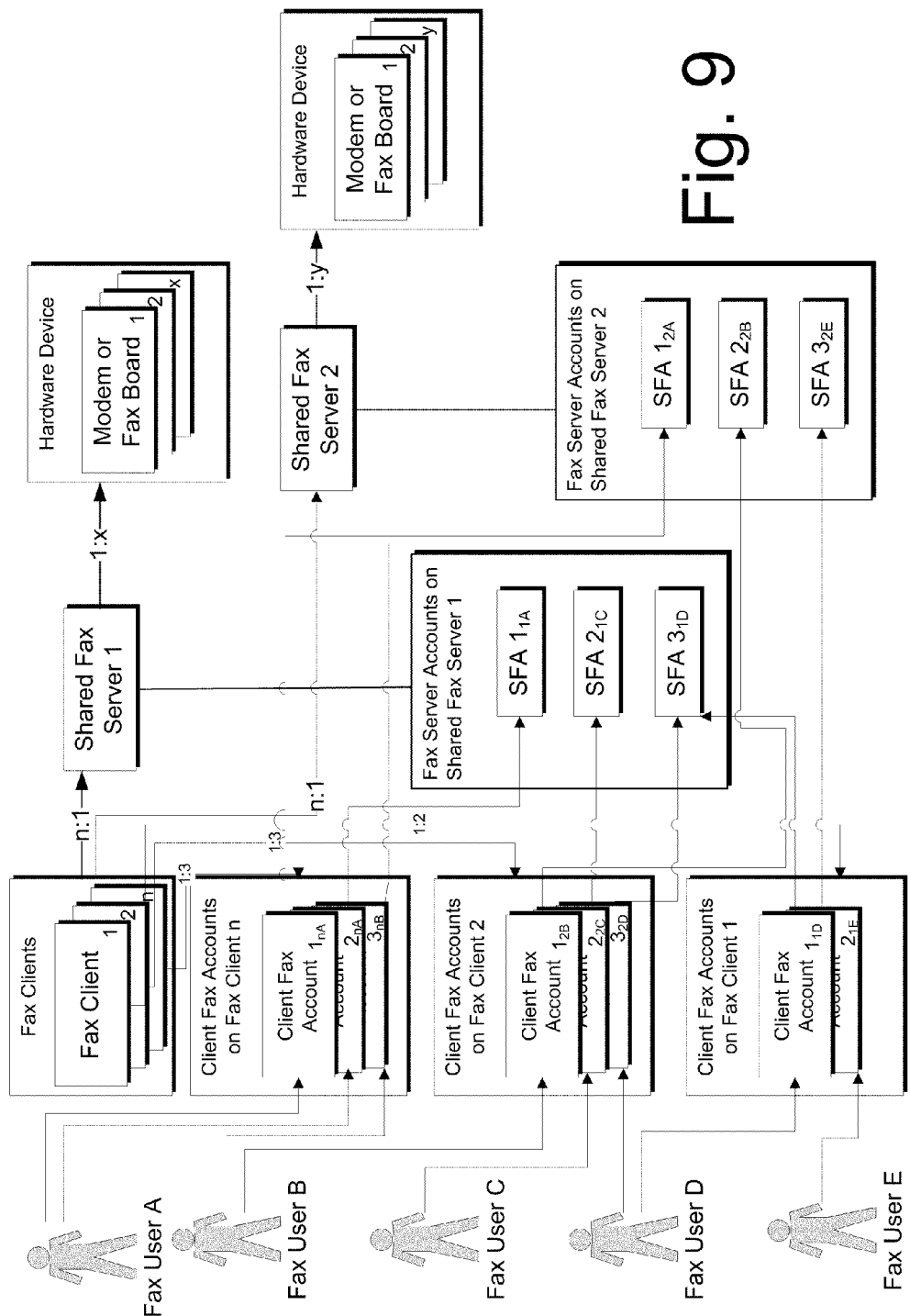
FIG. 9 illustrates an exemplary topology of a shared fax server in accordance with one embodiment.

As an example, consider FIG. 9 which illustrates a shared fax server scenario in accordance with one embodiment.

In this example, a true client-server setup is utilized in which multiple fax clients executing on different computing devices can connect to and interact with one or more dedicated fax server computing devices. In this example, a fax administrator dedicates and configures one or more modems or fax boards that are used for sending and receiving faxes by the server. Multiple modems or fax boards can be used to load balance heavy fax message traffic.

The fax administrator can set up server fax accounts (SFA) for users to use from different remote clients. On a client computing device, the fax user creates a single client fax account that is associated with their server fax account (SFA). In addition to setting up the SFA, the fax or system administrator can configure the accounts with certain attributes, such as restrictions on the amount of disk space that any one user can be allocated for use.

The topology of FIG. 9 illustrates a number of the different possible mappings that are possible. In this particular example, there is a 1:1 connection between a client fax account and a server fax account (SFA). Multiple client fax accounts can point to the same server fax account provided that the client fax accounts are set up on a physically different computing device.

In this particular example, on a single machine there can be only one client fax account linked to a single server fax account. In the figure, fax user B has set up a client fax account on both fax client 2 and fax client n, as he or she may frequently use both machines which may be located in different physical locations. Both client fax accounts are linked to the same server fax account (SFA$2_{2B}$) on shared fax server 2. Similarly, fax user D has a client fax account on fax client 2 and one on fax client 1. Each of these accounts is associated with the same server fax account (SFA$3_{1D}$) on shared fax server 1.

If there are multiple fax servers in the organization, as there are in this example, a fax user can have more than one server fax account, but only one per server. In the FIG. 9 illustration, fax user A has a fax server account on both shared fax server 1 (SFA$1_{1A}$) and shared fax server 2 (SFA$1_{2A}$). He accesses both accounts from a single client (n), and therefore has configured two client fax accounts, each associated with the server fax account on each shared server.

Having now described fax accounts in general, how such accounts can be created and configured, the infrastructure support mechanism for enabling a user to organize and manage faxes, various different account types and exemplary topologies in both the local modem instance and the shared server instance, consider now how a user can use such features.

Using a Fax Account

Having set up a fax account as described above, consider now how a user can create, send, receive and view faxes from within their account. In the discussion that follows below, specific examples are provided to give the reader some context on how a fax account might be used. It is to be appreciated and understood that the description that follows is not intended to limit application of the claimed subject matter.

Creating a Fax

In at least some embodiments, a user can employ a cover sheet in connection with their fax message. Cover pages provide a means to mark the boundary between the end of one fax and the start of another. In addition, cover pages can be used to identify the sender, the intended recipient, the subject, and other information.

In practice, cover page templates can be provided that include pre-designated fields (e.g. "From", "To", "Date", "Subject", "Importance" and the like) that enable a user to quickly and efficiently populate the cover page with the desired data. Alternately or additionally, certain fields (such as the "To" and "Date" fields) can be automatically pre-populated when the cover page is pulled up by the user.

In the illustrated and described embodiment, a user can create or compose a fax in a number of different ways. For example, a user can create a fax from within an email client. Alternately or additionally, a user can create a fax generally from within an application, such as a word processing application, spreadsheet application and the like. For additional information on how a user can create a fax as mentioned above, the reader is referred to U.S. patent application Ser. No. 11/112,843, entitled "Techniques for Creating a User-friendly Computer-Based Fax Experience", naming as inventors Hubert Van Hoof, filed on Apr. 22, 2005, assigned to the assignee of this document.

Sending a Fax

After a message has been composed in, for example, a compose window, the user can click on a "Send" button to send the fax message. In the illustrated and described embodiment, and in the instance where the user's infrastructure support resides in the form of a system of folders, the fax message can be moved from the "Drafts" folder to the "Outbox" folder. In this paradigm, the message then waits in the "Outbox" folder until the user clicks upon a "Send/Receive" button. At this point, the fax message is processed and sent to the intended recipient.

For additional information on sending a fax message, the reader is referred to the U.S. Patent Application mentioned just above.

Receiving and Viewing a Fax

With regard to receiving and viewing fax messages, there are a couple of different choices that one can make. First, the message can be delivered to the intended recipient only after the entire message is received. Alternately, the message or at least a portion of the message can be delivered prior to the entire message having been received.

In one embodiment, the fax message is delivered to the recipient's Inbox from the moment at least one page has been received. This way, the user can be provided with an early notification that a fax is inbound. In this particular scenario and in accordance with one embodiment, a fax message in the Inbox can show one of three possible states, each represented by its own message icon. An incoming state indicates that the fax is being received; a complete state indicates that the fax has been entirely received; and a failed state indicates that the fax was not completely received because an error occurred. In this scenario, the user can view the fax pages that were received before the transmission failure occurred.

In the shared fax server environment, faxes in a user's Inbox that have been assigned by a fax administrator can have accurate data about the sender (name, phone number metadata that can be added by the administrator after visual inspection of the first page of the fax) and the subject of the fax which is used to populate the "From" and "Subject" fields for the fax.

In accordance with one embodiment, viewing a fax in an Inbox adopts the e-mail metaphor. Hence, the look and feel of the fax experience can be similar in many regards to a user's email experience. In this context, a fax Preview pane can inhabit the same physical space as the e-mail Preview pane. In the illustrated and described embodiment, a fax preview displays bitmap pages that are by default scaled for their page width to fit the available space.

Figure 10:
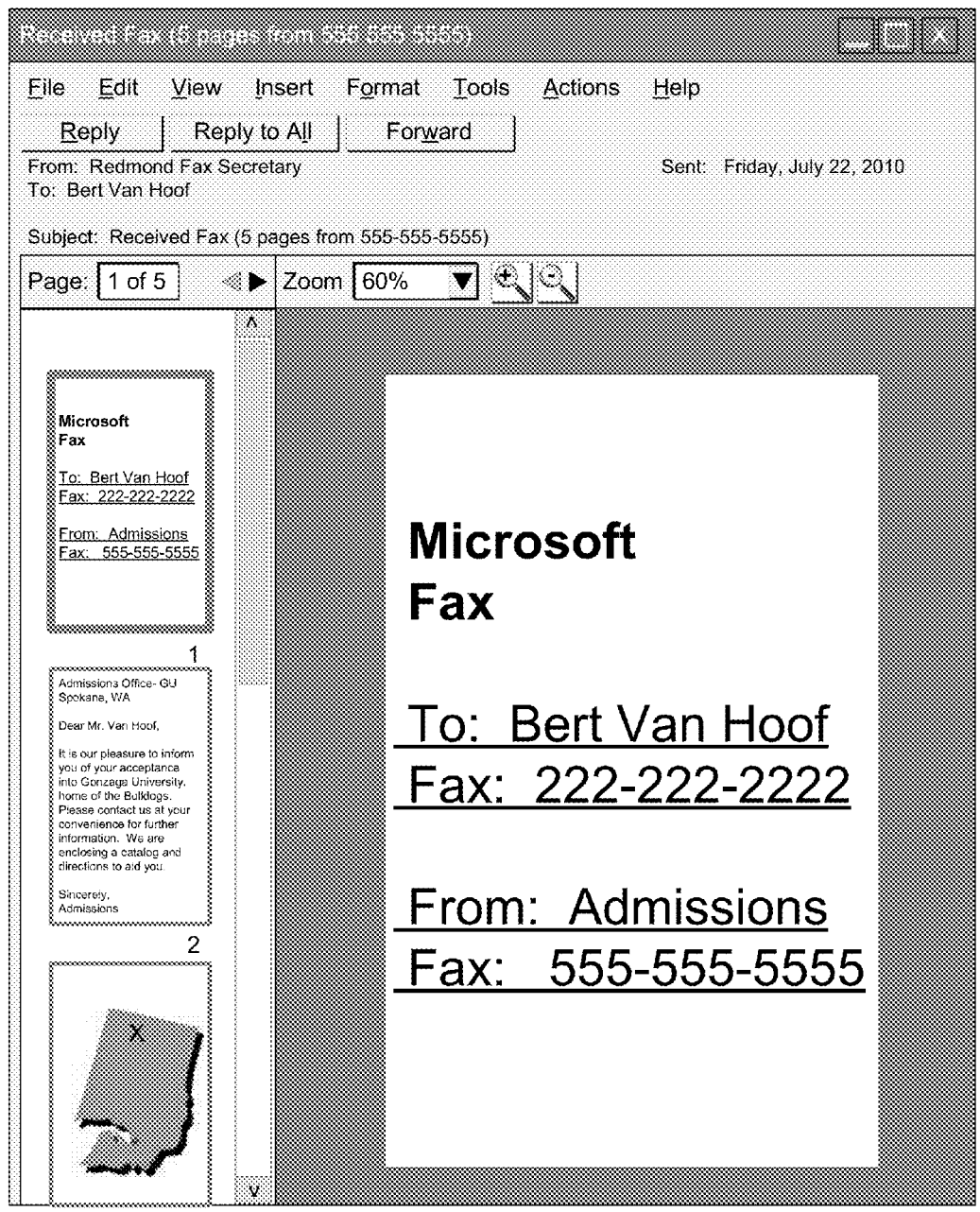
FIG. 10 illustrates an exemplary user interface in accordance with one embodiment.

If more control over the message's individual pages is desired, the user can double click the message line in the Inbox to open a fax message in its own fax message reader window. Here a view is enabled with an optional thumbnail pane on the left of the window, and a full page view on the right hand side. As an example, consider FIG. 10 which illustrates an exemplary fax message reader window in accordance with one embodiment. Notice to the left of the fax message appears a number of thumbnail views of individual pages of the fax message.

Re-Assigning Faxes

Having now considered fax accounts and how those fax accounts can be used to compose, send and receive fax messages, consider now the issue of routing fax messages to the appropriate and intended recipient in the context of the shared fax server.

When a fax message is received by an entity such as a small or large company, the fax message is typically received over one or a couple dedicated phone lines. That is, there is typically a single phone number given out for a particular entity and this phone number is used for all faxes that the entity receives. When a fax is received, there is typically no differentiation within the particular fax protocol to establish to whom the fax message is to be delivered. In addition, in scenarios that do not employ fax accounts, anyone with access to the fax server can typically access all fax messages.

Specifically, established fax protocols do not carry the same rich metadata to identify the sender and recipient of a message as do their e-mail counterparts. That means that when a fax is received, there is little or no metadata about the message itself, other than perhaps the highly unreliable Transmitting Subscriber Identification (TSID) and CSID identifiers, and a date and time stamp.

The actual content embedded in the message itself is consequently the only information available to find important attributes of the message that can help identify the sender and intended recipient, as well as the subject.

In the embodiments described below, fax messages can be examined and then re-assigned to the appropriate intended recipient. In the illustrated and described embodiments, this can take place in a number of different ways. For example, the fax message can be visually inspected by a system administrator or other designated person, and then re-assigned to the intended recipient.

Alternately or additionally, the fax message can be algorithmically analyzed and automatically re-assigned to the intended recipient. In some scenarios, the algorithmic analysis can be overseen and its accuracy confirmed by a system administrator or other designated person.

In each of these scenarios and in the event a cover sheet is used for the fax message, the system can be configured to allow access to only the cover sheet thus preserving the privacy of the message's content. In addition, to preserve the confidentiality of the fax message, the system can be configured to re-assign the fax message to the intended recipient, without retaining a copy of the fax message. This is somewhat different from the email paradigm in which a copy of a forwarded email message is retained by the individual who forwards the message.

Making these scenarios possible is the notion of the fax account, introduced above. With a fax account, each fax message is owned by a particular user having the fax account. A user can only view faxes that belong to or are associated with his or her fax account.

An accounts based model facilitates routing of faxes by re-assigning them to the account of the final recipient. In the illustrated and described embodiment, faxes that are received on a particular modem are viewable or process-able only by designated entities referred to as routing assistants. In at least some embodiments, the routing assistant is a human who may or may not draw upon automated algorithmic analysis techniques to help them in their routing tasks. In other embodiments, the routing assistant can be a purely automated solution.

Figure 11:
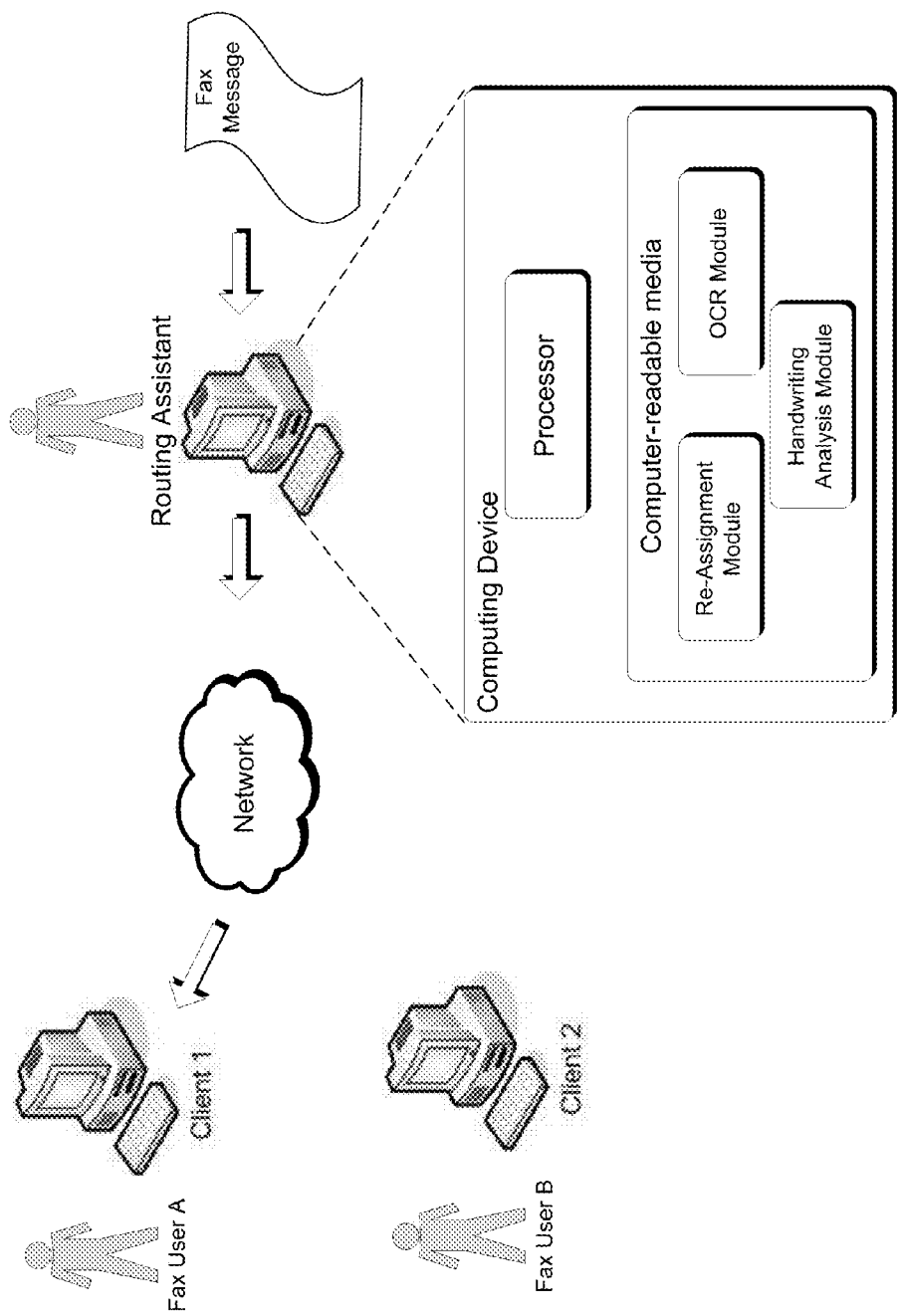
FIG. 11 illustrates an exemplary system in accordance with one embodiment.

As an example, consider FIG. 11 which shows a system having a routing assistant and two fax users A and B communicatively linked by a network. As a fax message is received, the routing assistant reassigns the received fax to the appropriate fax account. In this particular example, assume that the fax message is intended for fax user A. In this case, the routing assistant ascertains the intended recipient from the addressing information associated with the fax message, and then re-assigns the fax message to the intended recipient.

In many cases, a fax message will have a cover sheet. In these cases, the addressing information can be found on the cover sheet or, if no cover sheet is employed, on the first sheet of the fax message.

In at least some embodiments, the process of ascertaining the intended recipient is performed by visually inspecting the addressing information and then re-assigning the fax message to the appropriate recipient. In this case, the routing assistant, working on a computing device that receives the fax message, can re-assign the fax message from their computing device. In the FIG. 11 example, the routing assistant's computing device includes a processor and one or more computer-readable media. Embodied on the computer readable media are components that can help the routing assistant perform the re-assignment tasks. Specifically, in this example, a re-assignment module executing on the computing device can help the routing assistant pull up a list of potential fax recipients and then, for any particular fax message, select the appropriate recipient for fax re-assignment.

Alternately or additionally, the fax message can be algorithmically analyzed to ascertain the intended recipient. In this particular example, the algorithmic analysis of the fax message can take a number of different forms. For example, the fax message can be processed by an optical character recognition (OCR) module in an attempt to identify the intended recipient from text that might appear on a cover sheet. Alternately or additionally, a handwriting analysis module can process the fax message in an attempt to identify handwritten addressing information. The handwriting analysis module and the OCR module can work independently of one another or in concert with each other (including the human routing assistant).

As but one example of how re-assigning fax messages can take place in connection with the routing assistant, consider the following. Fax messages can have different attributes that facilitate their re-assignment. For example, the addressing information that can appear on a fax message cover sheet can provide one means through which the routing assistant can perform its function. In addition, at least some fax messages can include a TSID/CSID (mentioned above), a caller ID or call attributes such as the DID (mentioned above). These attributes can also provide a basis by which a routing assistant can perform its function. And, while some of these attributes may not be as accurate so as to support a fully automated solution with full confidence, these attributes can still be employed in combination with human intervention to reduce the likelihood of a misdirected fax message. For example, all fax messages that are received over a particular line may be automatically routed or re-assigned to a particular routing assistant (e.g., a fully automated routing assistant). This particular routing assistant can, in turn, view or otherwise evaluate the cover sheet information, including one or more of the attributes mentioned above, and re-assign the fax message to either another routing assistant (e.g., a human administrator to confirm the ascertained recipient), or to the intended recipient.

Implementation Example—Re-Assigning Faxes

In but one implementation example of re-assigning fax messages to the intended recipients in the context of a shared fax server environment, consider the following. A fax routing administrator can be given access rights to visually inspect the first page of all incoming faxes. Only allowing access to the first page significantly reduces privacy concerns, as in most cases the first page is a cover sheet. Typically a cover sheet or data embedded in the first page will contain all relevant metadata related to the fax message. This metadata can include, by way of example and not limitation, sender information, recipient name(s) and subject.

Thus, in this context, when a fax is received by a shared fax server, it is placed into an "All Fax Users" account which is the default account created by the fax server. The fax routing administrator is given access permissions to this universal account. This fax can then get moved to a particular individual user's account through manual intervention. In this example, the fax routing administrator first looks at the fax and decides to which user (and associated account) it belongs, and then assigns the fax to that user's fax account. This, in turn, can move that particular fax to the particular user's Inbox folders. One way that this can work is by having the fax routing administrator right-click on the Fax and select an "Assign to . . . " menu. From the "Assign to" menu, the fax routing administrator can select the appropriate intended recipient.

In this particular example, a user interface in the form of an "Assign Fax Dialog" can be presented to the fax routing administrator to assist them. The "Assign Fax Dialog" would, in the FIG. 11 example, be implemented by the re-assignment module. In one embodiment, in the "Assign Fax Dialog" the fax routing administrator can fill in metadata tag descriptions that pertain to the received fax. For example, the fax routing administrator can fill in information that pertains to the sender's name, the sender's fax phone number, the subject, and whether the fax has a cover page.

In addition, in at least one embodiment, the "Assign Fax Dialog" can enable the fax routing administrator to select multiple recipients and/or, in the event the intended recipient does not have an activated fax account, create a new fax account for the user.

Consider now the fully automated case in which, for example, either or both of the OCR module and handwriting analysis module are used for re-assigning faxes. In this case, assume that the cover sheet is in a generally standardized format which lends itself to quickly and accurately identifying pre-defined fields. In this case, the intended recipient might be quickly identified from the text appearing in the "TO" field. As such, the OCR module can work in concert with the re-assignment module to re-assign the fax message to the intended recipient. In this manner, the metatag descriptions in the re-assigned fax message mentioned above can be automatically populated by the re-assignment module and then re-assigned to the intended recipient.

In at least some embodiments, and by virtue of the fax account solution, various degrees of routing privileges can be assigned to individual fax accounts. For example, in the example discussed above, the fax routing administrator's fax account is configured to permit routing privileges. In addition, such privileges can have limitations imposed of them. For example a routing privilege may come with a restriction that only the first page of any one fax message can be reviewed, or that all pages of a fax message can be reviewed. In addition, administrator settings can define one or more time windows in a day for routing privileges, e.g. between 8-10 A.M. and 3-4 P.M. Further, administrator settings can define how notifications and routing are to take place in the event that fax messages are not routed within a certain definable window.

In addition, in some embodiments, rules can be set or defined for when full automatic routing is allowed based on algorithmic accuracy prediction of the routing information. For example, in the context of a medical or law office, fully automatic routing might not be desirable due to the sensitivity of the information that may be contained in a fax message. In this case then, a partially automated solution may be desirable in which, for example, an OCR module identifies the intended recipient which is then confirmed by a human administrator. Yet, in other contexts, a fully automated solution may be desirable, such as in those circumstances where the sensitivity material that might be contained in a fax message is not an issue.

FIG. 12 is a flow diagram that describes steps in a method in accordance within one embodiment. The method can be implemented in connection with any suitable hardware, software, firmware or combination thereof. In but one embodiment, the method can be implemented in connection with a shared fax server environment, examples of which are given above. In addition, in but one embodiment, the method can be implemented in connection with a system, such as the system shown and described in relation to FIG. 11.

Step 1200 receives a fax message. This step can be implemented in any suitable way. In but one embodiment, this step is performed in a shared fax server environment. In addition, this step can be performed by a fax routing administrator and/or a computing device that is embodied with the functionality described above.

Step 1202 ascertains the intended recipient(s) of the fax message. This step can be performed in a number of different ways. For example, this step can be performed manually, as by a fax routing administrator visually inspecting the fax message to ascertain the intended recipient(s). Alternately or additionally, this step can be performed semi-automatically, as by the fax message being algorithmically analyzed with a human administrator confirming the intended recipient. Alternately or additionally, this step can be performed in a fully automatic manner, as by the message being algorithmically analyzed, as described above.

Once the intended recipient(s) is (are) identified, step 1204 re-assigns the fax message to fax account(s) associated with intended recipient(s). Examples of how this can be done are described above. It is to be appreciated that this step can be performed manually, in a semi-automatic manner, or in an automatic manner.

Conclusion

In the embodiments described above, fax accounts are provided and used to create an association between users and documents that are faxed. A fax account allows a user to secure their faxed documents and organize and streamline fax communication via different transports, such as via a phone line/modem, a server (such as a Windows® server or Microsoft Exchange® server), an Internet fax service provider, and the like. Security is enhanced, in at least some embodiments, through the use of an authentication model that authenticates individual users before giving them access to the fax functionality or, more accurately, their fax account. Fax accounts also provide users with an infrastructure through which they can manage their documents. In the embodiments described in this document, the infrastructure that is employed is a folder infrastructure that is similar in look and feel to the folder infrastructure that a user may use to manage their email account. In addition, in at least some embodiments, fax accounts can be used to manage and direct received faxes to the intended recipient, thus reducing the possibility that an unintended recipient gaining access to the fax. This feature is implemented via the notion of privileges that can be assigned to individual fax accounts.

Further, fax accounts provide a foundation for extensibility into the future. Specifically, fax accounts can be embodied with properties and characteristics that further enhance the user experience. Accordingly, as developers come up with new and innovative features, these features can be easily incorporated into the overall fax functionality by virtue of the fax account.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
presenting a user interface for establishing a fax account, the user interface describing multiple different fax connection types from which a user can select to establish which fax connection type to use to send a fax from an email client or receive a fax into an inbox of the email client, the multiple different fax connection types comprising one or more fax modems, fax servers, or fax service providers;
responsive to receiving a selection of a fax connection type from the user, establishing a fax account that is associated with the user, wherein establishing the fax account comprises creating a management infrastructure through which the user can manage fax messages; and
displaying a second user interface through which the user can manage the fax messages, the second user interface being configured to display the fax messages for the user.

2. The method of claim 1 further comprising using the fax account to send and receive the fax messages.

3. The method of claim 1, wherein the act of establishing comprises associating one or more permissions with the fax account.

4. The method of claim 1, wherein the second interface comprises:
an Inbox folder configured to receive inbound fax messages, indicate a state of each fax message, and enable selection of a fax message;
a Preview Pane configured to enable a scaled display of a selected fax message;
an Outbox folder configured to contain outbound fax messages waiting to be sent; and
a Sent folder configured to indicate fax messages that have been sent.

5. The method of claim 4, wherein selection of the fax message comprises receiving an indication of at least one click on the fax message that causes a third user interface to display the fax message.

6. The method of claim 5, wherein display of the fax message comprises displaying one or more thumbnail representations of pages in the fax message.

7. The method of claim 4, wherein to indicate a state of each fax message comprises indicating that the fax message was not completely received if the fax message was not completely received.

8. A computer-implemented method comprising:
receiving, by a computing device, a user selection of one fax connection type from multiple different fax connection types that are displayed in a user interface to establish a client fax account, the multiple different fax connection types comprising one or more of a local fax modem, a multi-function peripheral fax modem, a fax server, or a fax service provider;
creating the client fax account on the computing device, the client fax account being associated with an individual user and describing connection settings that are to be used with the client fax account, the creating of the client fax account comprising creating a management infrastructure through which the user can manage fax messages; and
associating the client fax account with a server fax account that is on a shared fax server, the server fax account describing permissions associated with the client fax account, the shared fax server being configured to identify an intended recipient of a fax message received at the server fax account by analyzing text in the fax message using text recognition and re-assign the fax message to a client fax account associated with the intended recipient.

9. The method of claim 8, wherein the shared fax server is configured to enable multiple client fax accounts on different computing devices to connect to the shared fax server and interact with one or more dedicated fax server computing devices.

10. The method of claim 9 further comprising receiving, using the management infrastructure, a fax message that has been associated with the client fax account and routed from the shared fax server.

11. The method of claim 8, wherein creating the management infrastructure through which the user can manage the fax messages further comprises creating a folder infrastructure associated with the fax account, and wherein the folder infrastructure is configured to enable a user to create custom folders.

12. The method of claim 8, wherein creating the management infrastructure comprises causing creation of the management infrastructure on the shared fax server.

13. The method of claim 8 further comprising using said client and server fax accounts to send and receive fax messages.

14. A system comprising:
a processor;
one or more computer-readable storage media having stored thereon instructions that, when executed by the processor, implement a user interface system comprising:

a first user interface that describes multiple different fax connection types from which a user can select to establish a fax account and which is configured to enable creation of a management infrastructure through which the user can manage fax messages, the multiple different fax connection types being selectable by the user to establish which fax connection type to use when sending faxes via an application that is not primarily a fax application, the multiple different fax connection types including one or more fax modems, fax servers, or fax service providers; and a second user interface through which the user can manage the fax messages, the second user interface being configured to display one or more of the fax messages for the user.

15. The system of claim 14, wherein the second user interface comprises:

an Inbox folder configured to receive inbound fax messages, indicate a state of each fax message, and enable selection of a fax message;

a Preview Pane configured to enable a scaled display of a selected fax message;

an Outbox folder configured to contain outbound fax messages waiting to be sent; and a Sent folder configured to indicate fax messages that have been sent.

16. The system of claim 15, wherein the user interface system further comprises a third user interface configured to display one or more thumbnail representations of pages in the fax message.

17. The system of claim 16, wherein the third user interface is configured to enable a selection of the one or more thumbnail representation of pages in the fax message, wherein selection of the one or more thumbnail representation of pages causes display of a scaled view of a page associated with said one or more thumbnail representations.

18. The system of claim 14, wherein at least one fax connection type from which the user can select is a connection to a shared fax server.

19. The system of claim 18, wherein the shared fax server is located at a different computing device.

* * * * *